(12) United States Patent
Laeuffer

(10) Patent No.: US 7,533,745 B2
(45) Date of Patent: May 19, 2009

(54) POWER TRANSMISSION METHOD AND DEVICE FOR A MOTOR VEHICLE COMPRISING A HEAT ENGINE AND AT LEAST ONE ELECTRIC MACHINE

(75) Inventor: Jacques Augustin Laeuffer, Paris (FR)

(73) Assignee: Peugeot Citroen Automobiles SA, Velizy-Villacoublay (FR)

( * ) Notice: Subject to any disclaimer, the term of this patent is extended or adjusted under 35 U.S.C. 154(b) by 241 days.

(21) Appl. No.: 10/521,089

(22) PCT Filed: Jul. 11, 2003

(86) PCT No.: PCT/FR03/02211

§ 371 (c)(1), (2), (4) Date: Sep. 22, 2005

(87) PCT Pub. No.: WO2004/007228

PCT Pub. Date: Jan. 22, 2004

(65) Prior Publication Data

US 2006/0102396 A1 May 18, 2006

(30) Foreign Application Priority Data

Jul. 11, 2002 (FR) .................................. 02 08749

(51) Int. Cl.
*B60W 20/00* (2006.01)
*B60W 10/24* (2006.01)

(52) U.S. Cl. .............................. 180/65.29; 180/65.265; 180/65.28

(58) Field of Classification Search ................ 180/65.2, 180/65.3, 65.4; 903/941, 943
See application file for complete search history.

(56) References Cited

U.S. PATENT DOCUMENTS

| | | | | |
|---|---|---|---|---|
| 5,318,142 A * | 6/1994 | Bates et al. | ................. | 180/65.2 |
| 5,806,617 A * | 9/1998 | Yamaguchi | ................. | 180/65.2 |
| 5,823,281 A * | 10/1998 | Yamaguchi et al. | ........ | 180/65.2 |
| 5,984,033 A * | 11/1999 | Tamagawa et al. | ......... | 180/65.2 |
| 6,116,363 A | 9/2000 | Frank | | |
| 6,170,587 B1 | 1/2001 | Bullock | | |
| 6,220,019 B1 * | 4/2001 | Sugiura et al. | ................ | 60/285 |
| 6,296,593 B1 * | 10/2001 | Gotou et al. | ................ | 477/176 |
| 6,330,498 B2 * | 12/2001 | Tamagawa et al. | ............ | 701/22 |
| 6,376,927 B1 | 4/2002 | Hoang et al. | | |
| 6,603,278 B2 * | 8/2003 | Oshima et al. | .............. | 318/139 |
| 6,605,773 B2 * | 8/2003 | Kok et al. | .................... | 136/242 |
| 6,608,396 B2 * | 8/2003 | Downer et al. | ............ | 290/40 C |
| 6,740,002 B1 * | 5/2004 | Stridsberg | .................... | 477/14 |
| 6,897,629 B2 * | 5/2005 | Wilton et al. | ................ | 318/139 |
| 6,941,198 B2 * | 9/2005 | Brigham et al. | ................ | 701/22 |
| 6,982,499 B1 * | 1/2006 | Kachi et al. | .................... | 307/75 |
| 7,056,251 B2 * | 6/2006 | Ibaraki | .......................... | 475/5 |
| 7,100,721 B2 * | 9/2006 | Atarashi et al. | ............. | 180/65.2 |
| 7,117,071 B2 * | 10/2006 | Aoki et al. | ..................... | 701/22 |
| 7,189,177 B2 * | 3/2007 | Takasu et al. | ................... | 475/5 |
| 7,205,731 B2 * | 4/2007 | Nagayama | ................... | 318/139 |
| 7,298,104 B2 * | 11/2007 | Besnard et al. | ............. | 318/432 |

* cited by examiner

*Primary Examiner*—Jeffrey J Restifo
(74) *Attorney, Agent, or Firm*—Nicolas E. Seckel

(57) ABSTRACT

A system is provided for powering a motor vehicle using a heat engine and an electric machine. The vehicle includes a supercapacitor which stores unused energy from the heat engine. When the vehicle speed stabilizes, energy is stored in the supercapacitor. The heat engine is shut down and the energy from the supercapacitor is then used to power the electric machine which supplies power to the wheels.

6 Claims, 3 Drawing Sheets

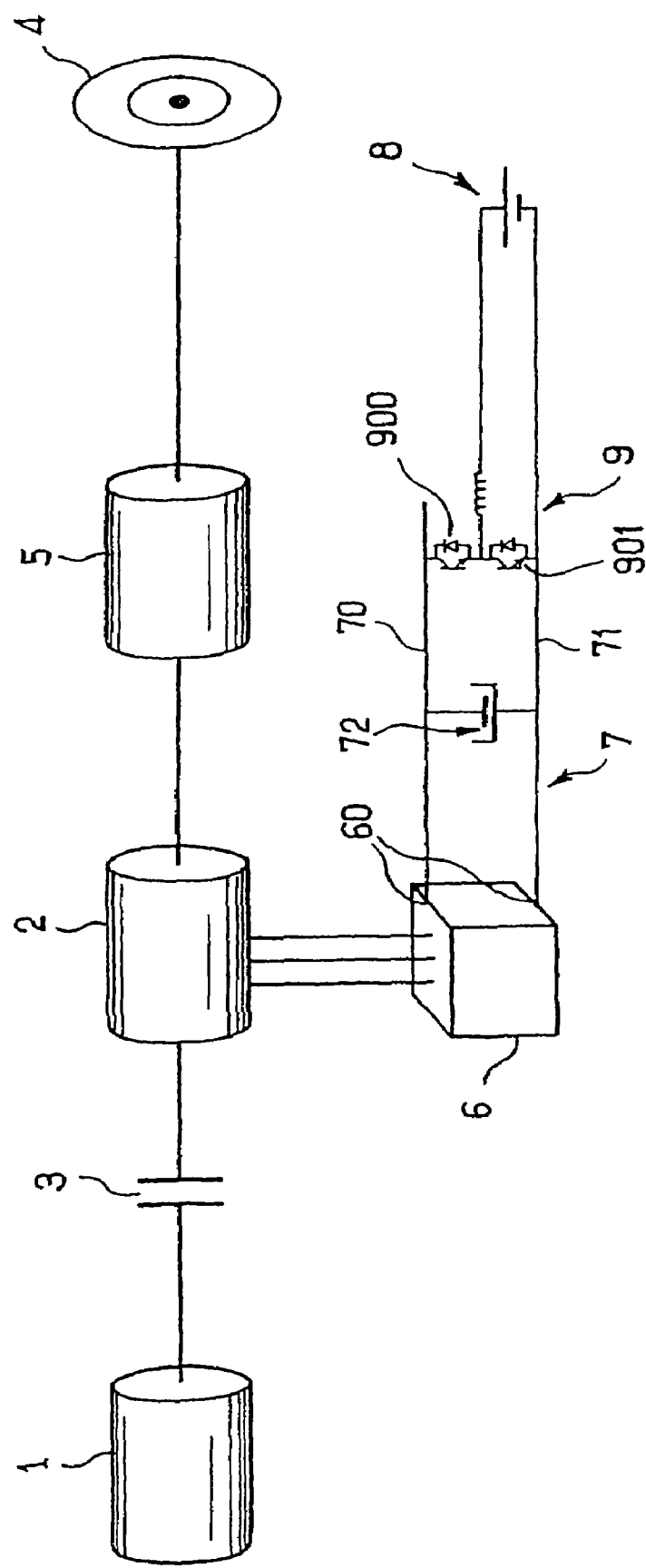
FIG_1

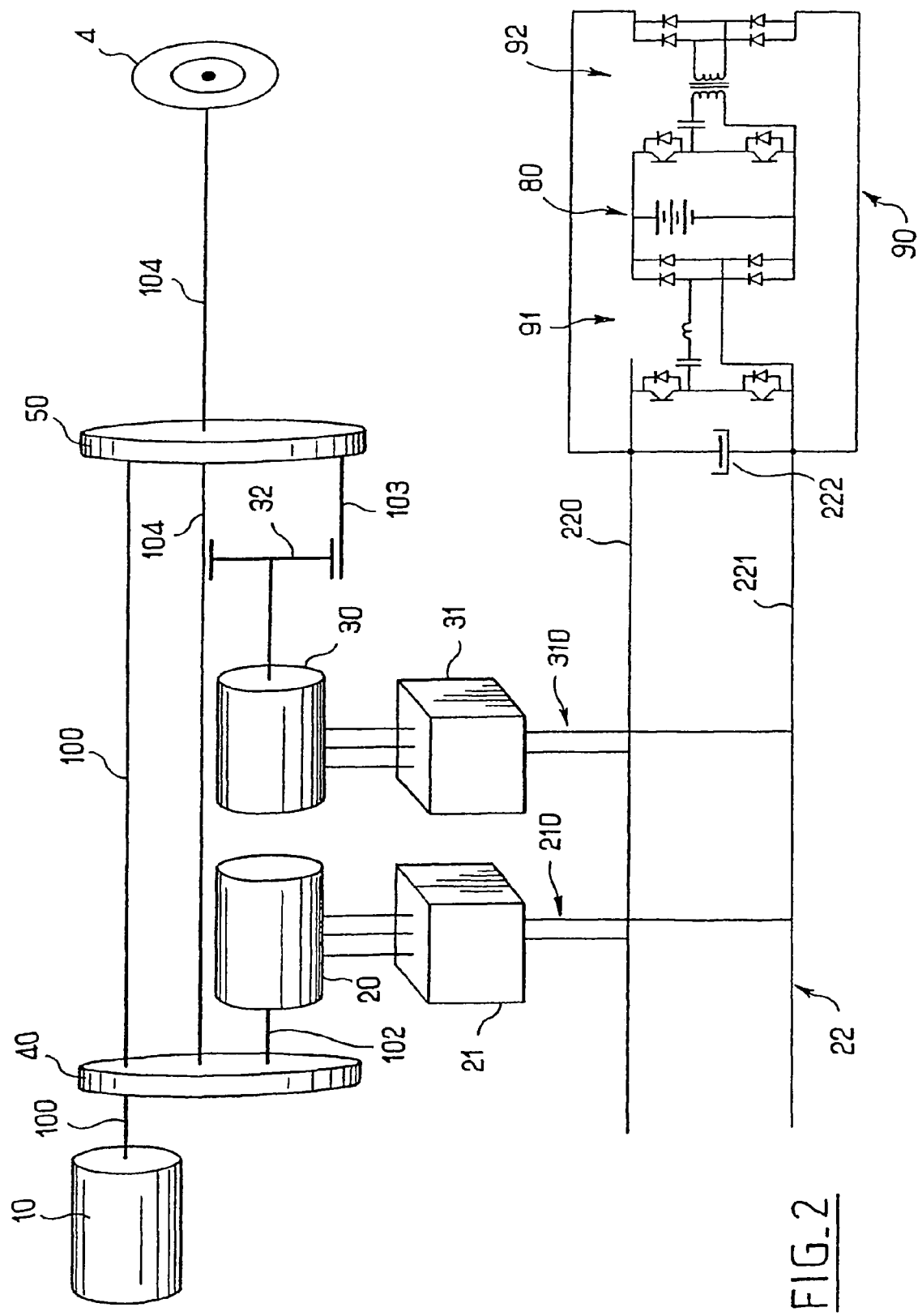
FIG_2

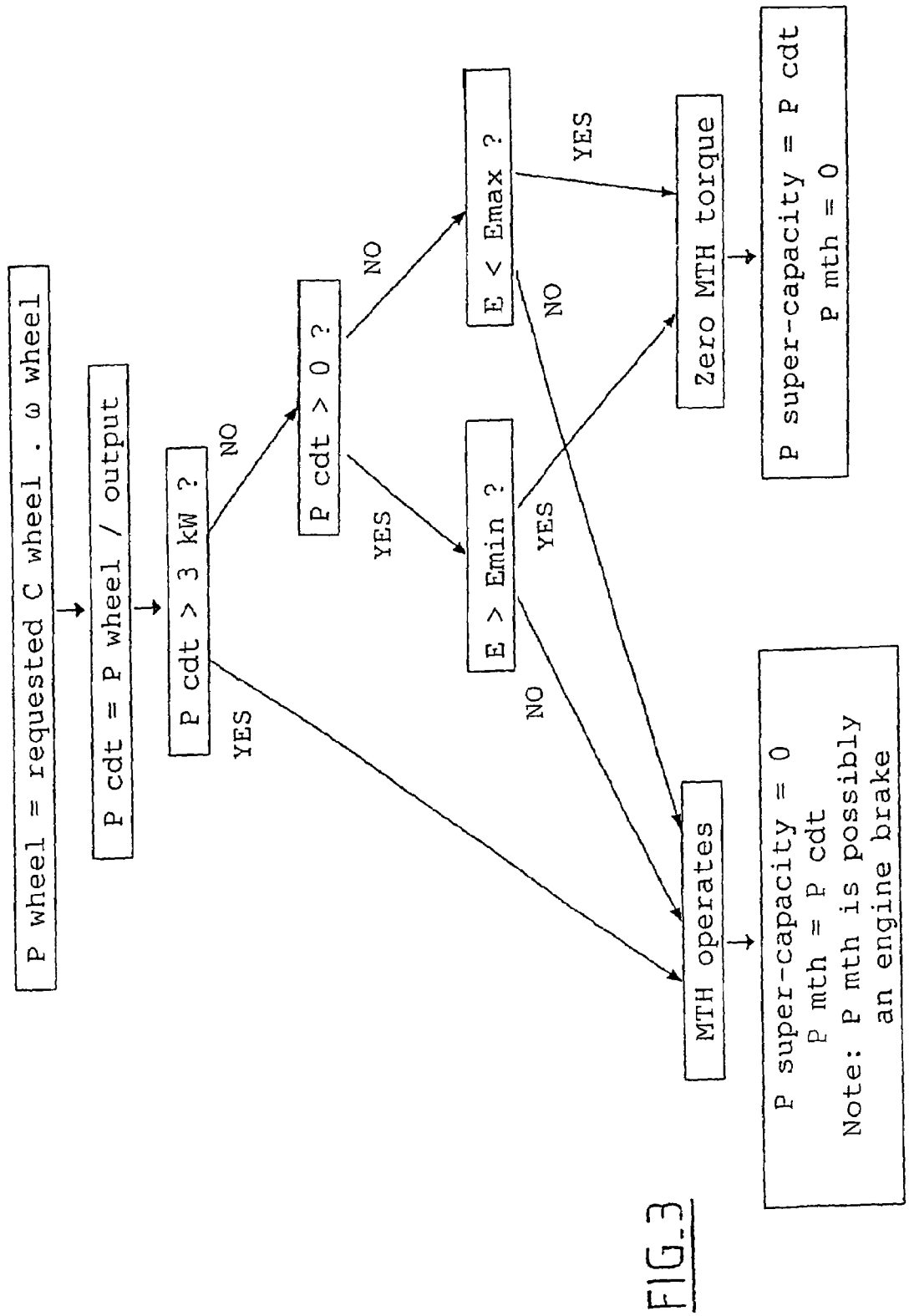
FIG_3

POWER TRANSMISSION METHOD AND DEVICE FOR A MOTOR VEHICLE COMPRISING A HEAT ENGINE AND AT LEAST ONE ELECTRIC MACHINE

CROSS REFERENCE TO RELATED APPLICATIONS

This application is a National Phase Entry under §371 of International Application No. PCT/FR2003/002211, filed Jul. 11, 2003, which in turn claims the benefit of French Application No. 02/08749, filed Jul. 11, 2002.

BACKGROUND OF THE INVENTION

The invention relates to the field of motor vehicles wherein the propulsion is provided by a heat engine and at least one electric machine.

When the vehicle slows down, its kinetic energy is normally lost.

It is for this reason that sometimes means are provided to recuperate this energy and store it for later use. This allows overall fuel consumption to be reduced.

Thus, such an electric machine is usually connected to a battery, intended to supply energy to this electric machine or to store energy from said machine.

Furthermore, it is known that a heat engine presents a poor efficiency at low power.

Consumption is therefore high at the idle point of a heat engine.

It is for this reason that, when a hybrid vehicle operates at idle point, the heat engine is normally shut down. The propulsion of the vehicle is provided by the electric machine, the battery thus being the only source of energy.

However, a battery has numerous drawbacks. It is expensive in relation to the overall cost of the vehicle and its life span is relatively short. Finally, it is heavy and cumbersome.

The purpose of the invention is to overcome the drawbacks associated with the use of a battery, while enabling the recuperation of the kinetic energy of the vehicle and avoiding the use of the heat engine at low power.

SUMMARY OF THE INVENTION

In one embodiment, the present invention comprises a method for transmitting power to wheels of a motor vehicle with an engine, the method comprising recuperating and storing kinetic energy of the motor vehicle in a super-capacitor, shutting down the engine of the motor vehicle when the speed of the motor vehicle stabilizes, and using the stored energy in the super-capacitor to supply power to the wheels when the speed of the vehicle is stabilized. The speed at which the vehicle stabilizes may be less than or equal to 30 miles per hour or 20 miles per hour.

The motor vehicle used in the above method may further comprise an electric machine connected to a static energy converter with terminals and at least one power semiconductor. The method may further comprise controlling voltage at said terminals in order to keep the voltage substantially constant and near to a maximum value allowed by the power semiconductor. The method may also comprise maintaining the voltage at the terminals of the static energy converter at a reference value $U_{ref}$ equal to: $U_{ref}=\text{MIN}[(U_1-\lambda.l); \text{MAX}(U_2; (U_3/k))]$ where: $U_1$ is a withstand voltage of the power semiconductors; $\lambda.l$ is an over-voltage at the terminals of the power semiconductors, l being a current passing through the electric machine; $U_2$ is the difference between $U_1$ and a maximum over-voltage at the terminals of the power semiconductors; $U_3$ is the voltage at the terminals of the electric machine; and k is a constant coefficient referred to as the PWM coefficient (Pulse Width Modulation).

The method may also comprise keeping the voltage at the terminals of the static energy converter between two limit values, the first corresponding to $U_2$ and the second corresponding to $(U_1-\lambda.l)$, where: $U_1$ is a withstand voltage of the power semiconductor; $\lambda.l$ is an over-voltage at the terminals of the power semiconductors, l being the current passing through the electric machine; and $U_2$ is the difference between $U_1$ and the maximum over-voltage at the semiconductors.

The method may also comprise keeping the voltage at $U_2$, that being the difference between $U_1$, the withstand voltage of the power semiconductors, and the maximum over-voltage at the terminals of the semiconductors.

In another embodiment, the present invention comprises a motor vehicle, comprising a heat engine, at least one electric machine with a static energy converter, and a super-capacitor for supplying and storing energy, connected to the electric machine via a reversible DC-DC converter. The DC-DC converter may be two transistors or two resonance converters. The super-capacitor may be connected between the two resonance converters.

In another embodiment, the present invention comprises a method of providing power to at least one wheel of a motor vehicle having a gasoline engine, an electric engine, and a super-capacitor, the method comprising monitoring the speed of the motor vehicle; storing kinetic energy of the vehicle in the super-capacitor; when the speed has stabilized: turning off the gasoline engine, powering the electric engine from the super-capacitor, and propelling the vehicle using the electric engine; when the speed has de-stabilized activating the gasoline engine, and propelling the vehicle using the gasoline engine.

BRIEF DESCRIPTION OF THE DRAWINGS

FIG. 1 depicts a device for transmitting power according to the invention, comprising an electric machine, a heat engine and a DC-DC converter of reversible DC converter type.

FIG. 2 depicts a device for transmitting power according to the invention, comprising two electric machines, a heat engine and a DC-DC converter comprising two resonance converters.

FIG. 3 is an algorithm giving an example of a control strategy for a heat engine according to the power requested at the wheels and the energy stored in the super-capacitor.

DETAILED DESCRIPTION OF A PREFERRED EMBODIMENT

This invention relates to a method for power transmission to the wheels of a motor vehicle, comprising a heat engine and at least one electric engine associated with a static energy converter and with means for supplying and storing energy, the method consisting of recuperating and storing the kinetic energy of the vehicle in supply and storage means consisting of a supercapacitor and in reusing the stored energy to supply power to the wheels when the speed of the vehicle is stabilized, the heat engine thus being shut down.

The supercapacitor is the sole means for supplying and storing energy provided in the vehicle. In particular, no battery is provided.

Preferentially, the stabilized speed at which the power supplied to the wheels comes from the supercapacitor is less than or equal to about 30 mph or even less than or equal to 20 mph.

The supercapacitor is typically about 50 kJ for an average size vehicle.

The power to be transmitted to the wheels is between 5 and 6 kW for a speed stabilized at about 30 mph and about 3 kW for a speed stabilized at about 20 mph. At these stabilized speeds, the supercapacitor therefore allows the heat engine to be shut down for 10 to 20 seconds.

Indeed, the consumption of a heat engine (conso) is an affine function of the power generated by the engine (Pmth), in the case where the heat engine runs at its maximum power point, which is generally the case for hybrid vehicles.

Thus, when the engine is running:

$$\text{Conso} = \text{conso}_o + K \cdot \text{Pmth} \tag{1}$$

where: Conso is the instantaneous consumption of the heat engine expressed in l/s;
$\text{conso}_o$ is the consumption of the engine at idle point, when the generated power is zero; it is a constant expressed in l/s which only depends on the heat engine;
K is also a constant which only depends on the heat engine; and
Pmth is the power generated by the heat engine, expressed in kW.

The consumption of the heat engine is zero when the heat engine is shut down.

The consumption over a consumption measuring cycle (for example European cycle 99100) is thus:

$$\text{Conso} = \text{conso}_o \cdot \text{Ton mth} + K \cdot \text{Emth} \tag{2}$$

where: Conso is the consumption of the heat engine over the cycle in question, expressed in l;
$\text{conso}_o$ is the consumption of the engine at idle point, expressed in l/s;
Ton mth is the time during which the heat engine is running during a cycle, expressed in s;
Emth is the energy of the heat engine, expressed in kJ.

Since the vehicle is equipped with a means for intermediate energy storage, the instantaneous power of the heat engine is not necessarily equal to the instantaneous power at the wheel. However, the measurement of the consumption of the vehicle over an entire cycle shows an average energy balance of zero on this energy storage. Consequently:

$$\text{Emth(kJ)} = \text{Wheel energy(kJ)}$$

As a result, the equation (2) can also be expressed as:

$$\text{Conso} = \text{conso}_o \cdot \text{Ton mth} + K \cdot \text{Wheel energy} \tag{3}$$

The aim is to minimize the consumption of the heat engine.

Yet, $\text{conso}_o$ and K are constants and Wheel energy (kJ) is imposed by the cycle and hardly depend on the chosen energy storage strategy.

It is therefore necessary to minimize Ton mth.

As known, the heat engine can be shut down when the vehicle has stopped and/or during deceleration.

The invention proposes to also stop it at other periods when the power at the wheel is low, i.e. during operation at stabilized speed. Since the duration of these periods is about 10 to 20 seconds, the energy storage capacity of a supercapacitor is particularly suitable.

The method according to the invention therefore allows fuel consumption to be reduced through the use of a supercapacitor.

Generally, a supercapacitor allows less energy to be recuperated than a traditional battery.

For example, for a cycle 99100, the recuperated energy represents about 70% of the energy recuperated by a traditional battery.

However, this is not overly disadvantageous, particularly when a vehicle is used in urban areas where the speed is generally less than 30 mph.

Furthermore, a supercapacitor has considerable advantages over a battery, in terms of cost, size and life span.

Advantageously, the method according to the invention also consists in controlling the voltage at the terminals of the static energy converter in order to keep it substantially constant and near to the maximum value allowed by the power semiconductors of the static energy converter.

This control of the voltage at the terminals of the static energy converter makes it possible, by keeping it as high as possible, to reduce the current running through the electric machine and the power semiconductors.

The capacity of the semiconductors and therefore their cost can thus be consequently reduced.

In practice, the value selected to perform the control can be a reference value $U_{ref}$ equal to:

$$U_{ref} = \text{MIN}[(U_1 - \lambda \cdot l); \text{MAX}(U_2; (U_3/k))]$$

where: $U_1$ is the withstand voltage of the power semiconductors;
$\lambda \cdot l$ is the over-voltage at the terminals of the power semiconductors, l being the current running through the electric machine;
$U_2$ is the difference between $U_1$ and the maximum over-voltage at the terminals of the semiconductors;
$U_3$ is the voltage at the terminals of the electric machine; and
k is a constant coefficient referred to as the PWM coefficient (Pulse Width Modulation).

The control can also be performed between two limit values, the first corresponding to $U_2$ and the second corresponding to $(U_1 - \lambda \cdot l)$.

This control can be simplified further by keeping the voltage at the terminals of the static energy converter to $U_2$.

The invention also relates to a device for transmitting power to the wheels of a motor vehicle allowing this method to be implemented.

This device thus comprises a heat engine and at least one electric machine, associated with a static energy converter and means for supplying and storing energy, characterized in that the means for supplying and storing energy consist in a supercapacitor, the static energy converter associated with an electric machine being connected to the supercapacitor via a reversible DC-DC converter.

The presence of this DC-DC converter allows the voltage at the terminals of the static energy converter to be kept at a substantially constant value, while being able to adjust the voltage at the terminals of the supercapacitor in large proportions.

The energy stored in a supercapacitor corresponds to $\frac{1}{2}CV^2$ where V is the voltage at the terminals of the supercapacitor, which makes it possible to fully exploit this energy reserve.

Thus, the transmission device according to the invention makes it possible, by means of suitable control of the voltage at the terminals of the static energy converter, to use undersized power semiconductors compared to those needed for an electric machine operating with a battery. This makes it possible to considerably reduce the cost of the static energy converter.

Furthermore, it makes it possible to make full use of the energy storage capacity of the supercapacitor.

This DC-DC converter can notably be a "reversible DC converter" type converter or a "two resonance converters" type converter.

Generally, the DC-DC converter is designed as follows.

When the kinetic energy of the vehicle is recuperated, the power travels from the static energy converter to the supercapacitor. The converter capacity is 10 kW so as to recuperate the deceleration powers generated when the vehicle is used in urban areas.

When the energy stored in the supercapacitor is transmitted to the wheels, since the heat engine is shut down, the power is transmitted from the supercapacitor to the static energy converter. In this electric-only mode, the converter capacity is 2.5 kW in order to supply the power to the wheels at stabilized speed, preferably for speeds less than or equal to about 20 mph.

With reference to the Figures, FIG. 1 represents an example of an embodiment of the transmission device according to the invention comprising an electric machine 2 and a heat engine 1, the electric machine and the heat engine being connected via a clutch 3.

The electric machine 2 is connected to the wheels 4 of the vehicle, via a gear box 5.

Furthermore, a static energy converter 6 is associated with the electric machine 2.

The DC supplies 60 of the converter 6 are connected to a bus 7 wherein two lines bear the references 70 and 71.

A capacitor 72 which provides a small level of energy storage is connected between the two bus lines.

It typically has a capacitance of 2000 μF and therefore contains a maximum energy of 300 J.

This capacitor essentially has a filtering function for high frequency currents generated by the inverter.

The two bus lines 70 and 71 are connected together by a supercapacitor 8.

For an average sized vehicle, it has a typical capacitance of 10 F and contains a maximum energy of about 50 kJ.

A DC-DC converter 9 is connected between the two bus lines 7 between the capacitor 72 and the supercapacitor 8.

In the example illustrated in FIG. 1, the converter 9 is "reversible DC converter" type with two transistors 900 and 901.

Thus, the method according to the invention will consist in recuperating and storing the kinetic energy of the vehicle in the supercapacitor 8 and reusing the energy stored to supply power to the wheels when the speed of the vehicle is stabilized, typically at a value less than or equal to 20 mph, the heat engine thus being shut down for short periods.

It therefore makes it possible to reduce fuel consumption and from time to time shut down the heat engine, the power to the wheels thus being provided by the supercapacitor.

The presence of the DC-DC converter 9 makes it possible to implement the alternative method according to the invention, wherein the voltage at the terminals of the static energy converter 6 is controlled in order to keep it substantially constant and close to the maximum value allowed by the semiconductors of the converter 6.

Control means therefore directly act on the converter 9 in order to keep the voltage U between the two bus lines at the desired maximum value $U_{ref}$.

As explained above, this value can be constant and correspond to the voltage $U_2$ whose value is equal to the difference between the value of the voltage $U_1$, the withstand voltage of the semiconductors of the static converter 6, and the maximum over-voltage at the terminals of said semiconductors.

The control can also be performed by using as the reference value a voltage between $U_2$ and another limit value defined by $(U_1-\lambda.1)$, i.e. the difference between the value of the withstand voltage $U_1$ of the semiconductors and the actual overvoltage at the terminals of the semiconductors.

This control can also be performed on the basis of a reference voltage corresponding to:

$$U_{ref}=MIN[(U_1-\lambda.l);MAX(U_2;(U_3/k))]$$

where: $U_1$, $\lambda.l$ and $U_2$ are as defined above, and $U_3$ is the voltage at the terminals of the electric machine, and k is a constant coefficient referred to as the PWM coefficient.

This coefficient is determined by the operation of the inverter and its value is typically 0.76.

The presence of this converter 9 also makes it possible to adjust the voltage at the terminals of the supercapacitor 8 in large portions and therefore fully exploit this energy reserve.

Keeping the voltage at a relatively high value at the terminals of the static energy converter 6 has consequences on the capacity of the semiconductors for the following reasons.

Generally, the relationship between the voltage $U_3$ at the terminals of the electric machine and the voltage U between the two bus lines is defined by:

$U_3 < kU$, where k is the PWM coefficient.

Furthermore, the voltage $U_3$ at the terminals of the electric machine is defined by:

$$U_3 = n \cdot \phi \cdot \omega$$

where: n is the number of turns in the electric machine,

φ is the magnetic flux in the electric machine, and

ω is the speed of the machine.

Thanks to the control means, the voltage $U_3$ at the terminals of the machine is maximized, as the voltage U at the terminals of the static converter 6 is itself maximized.

Therefore, to reach the desired speed ω a maximum product n·φ must be envisaged during the design of the electric machine.

In particular, the number n of turns must be increased compared to an electric machine which operates with a battery and without any means for controlling the voltage.

Yet, the torque C of the electric machine is equal to:

$$C = n \cdot \phi \cdot l$$

Where: n is the number of turns in the electric machine,

φ is the magnetic flux of the machine, and l is the current passing through the machine.

Thus, since the electric machine is designed for a maximum product n·φ, the desired torque C can be reached with a minimum current l.

Yet, the current l passing through the electric machine also passes through the power semiconductors of the static energy converter.

Thus, by keeping the voltage U at a relatively high value at the terminals of the static energy converter 6 the current l passing through both the electric machine and the static energy converter can be reduced by means of a suitable design of the electric machine.

Since the current l in the power semiconductors is relatively low, the capacity of the semiconductors can be consequently reduced. The cost of these semiconductors is this dramatically reduced.

With reference to FIG. 2 which describes another embodiment of the device for transmitting power according to the invention which comprises a heat engine 10, two electric machines 20 and 30, as well as a DC-DC converter 90.

The heat engine 10 is connected to a planetary gear set 40 via a shaft 100. The power generated by the heat engine is transmitted via the gear set 40, on one hand directly to the wheels 4 via shafts 100 and 104 and to another planetary gear set 50 and on the other hand to the electric machine 20 via the shaft 102.

The first electric machine 20 is associated with a static energy converter 21, which is connected via its DC supplies to a bus 22.

The second electric machine 30 is associated with a static energy converter 31 wherein the DC supplies 310 are also connected to the bus 22, wherein the two lines are referenced 220 and 221.

The second electric machine 30 is connected via a clutch coupling 32 to the shaft 103 or to the shaft 104.

The shaft 103 is connected to the planetary gear set 50, as are the shafts 101 and 104. The output shaft of the transmission gear set 50 is connected to the wheels 4 of the vehicle by the shaft 104.

In this embodiment, one of the two electric machines 20 and 30 generally operates in generator mode, the other then operates in engine mode.

According to the operating mode, the second electric machine can be connected to the shaft 103 or the shaft 104 via the clutch coupling 32.

A capacitor 222 which has the same function as the capacitor 72, described with reference to FIG. 1, is connected between the two bus lines.

The two lines of the bus 22 also supply power to a DC-DC converter 90, in turn consisting of two resonance converters 91 and 92.

A supercapacitor 80 is connected between the converters 91 and 92.

The converter 91 is capable of taking energy from the bus 22 to transmit it to the supercapacitor 80, whereas the converter 92 is capable of taking energy from the supercapacitor 80 to transmit it to the bus 22.

The converter 91 typically has a capacity of 10 kw in order to recuperate the deceleration powers occurring in urban areas.

The converter 92 typically has a capacity of 2.5 kW in order to supply the power to the wheels at a stabilized speed less than or equal to about 20 mph.

Thus, the presence of the supercapacitor 80 makes it possible to recuperate and store the kinetic energy of the vehicle and to reuse it to provide power to the wheels when the speed of the vehicle is stabilized, the heat engine thus being shut down.

Furthermore, this alternative embodiment of the transmission device according to the invention also makes it possible, by means of the converter 90, to keep the voltage at the terminals of the bus and therefore the static energy converters 21 and 31 substantially constant and close to the maximum value allowed by the power semiconductors of the static energy converter, by means of suitable control.

Aforementioned examples of control are also applicable to the transmission device according to FIG. 2.

As explained above, this control makes it possible to minimize the cost of the power semiconductors in the static energy converters 21 and 31.

Reference is now made to FIG. 3 which gives an example of a control strategy for a heat engine according to the power requested at the wheels and the energy stored in the supercapacitor.

Firstly, it is necessary to determine the power requested at the wheels, $P_{WHEEL}$, notably by detecting the depression of the accelerator pedal.

This makes it possible to determine the power of the traction chain, $P_{CDT}$, according to the yield.

The power of the traction chain $P_{CDT}$, is then compared with the value of 3 kW corresponding to the power to be transmitted to the wheels for a stabilized speed of about 20 mph.

If the power of the traction chain is greater than 3 kW then the vehicle does not operate at low power and the heat engine provides the propulsion of the vehicle.

On the other hand, if the power of the traction chain is less than 3 kW then the vehicle operates at low power and it can then be envisaged to use the energy stored in the supercapacitor.

It is then necessary to determine whether the power of the traction chain is positive or not.

If it is positive, the energy E stored in the supercapacitor is compared to the minimum value $E_{MIN}$.

If the energy stored in the supercapacitor is less than this minimum value then the supercapacitor is not capable of transmitting sufficient power to the wheels and the heat engine operates normally.

If, on the other hand, it is greater than this minimum value $E_{MIN}$ then the heat engine can be shut down. The torque generated by the heat engine is then zero, and the energy stored in the supercapacitor is used. In this case, the power of the traction chain corresponds to the power supplied by the supercapacitor.

If the power of the traction chain $P_{CDT}$ is negative then the energy E stored in the supercapacitor is compared to a maximum value $E_{MAX}$, in order to verify whether the supercapacitor is full or not.

If the value E is greater than $E_{MAX}$ then the supercapacitor is full and the heat engine operates.

On the other hand, if the value E is less than $E_{MAX}$ then energy can still be stored in the supercapacitor, the heat engine being shut down.

Here again, the power of the traction chain corresponds to the power exchanged by the supercapacitor, the power supplied by the engine being zero.

The reference marks inserted after the technical characteristics indicated in the claims have the sole purpose of making them easier to understand and do not restrict their scope in any way.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method for transmitting power to wheels of a motor vehicle with an internal-combustion engine and an electric machine connected to a static energy converter with terminals and at least one power semiconductor, the method comprising:
   recuperating and storing kinetic energy of the motor vehicle in a super-capacitor;
   shutting down the internal-combustion engine of the motor vehicle when the speed of the motor vehicle stabilizes;
   using the stored energy in the super-capacitor to supply power to the wheels when the speed of the vehicle is stabilized; and
   controlling voltage at the terminals of the static energy converter in order to keep the voltage substantially constant and near to a maximum value allowed by the at least one power semiconductor of the static energy converter.

2. The method of claim 1, wherein the speed at which the vehicle stabilizes is less than or equal to 30 miles per hour.

3. The method of claim 1, wherein the speed at which the vehicle stabilizes is less than or equal to 20 miles per hour.

4. A method for transmitting power to wheels of a motor vehicle with an internal-combustion engine and an electric machine connected to a static energy converter with terminals and at least one power semiconductor, the method comprising:
   recuperating and storing kinetic energy of the motor vehicle in a super-capacitor;
   shutting down the internal-combustion engine of the motor vehicle when the speed of the motor vehicle stabilizes;
   using the stored energy in the super-capacitor to supply power to the wheels when the speed of the vehicle is stabilized;
   controlling voltage at the terminals of the static energy converter in order to keep the voltage substantially constant and near to a maximum value allowed by the at least one power semiconductor of the static energy converter; and
   maintaining the voltage at the terminals of the static energy converter at a reference value $U_{ref}$, equal to:

$$U_{ref}=\text{MIN}[(U_1-\lambda.l);\text{MAX}(U_2;(U_3/k))]$$

where: $U_1$ is a withstand voltage of the power semiconductors;
   $\lambda.l$ is an over-voltage at the terminals of the power semiconductors, $l$ being a current passing through the electric machine;
   $U_2$ is the difference between $U_1$ and a maximum over-voltage at the terminals of the power semiconductors;
   $U_3$ is the voltage at the terminals of the electric machine; and
   k is a constant coefficient referred to as the PWM coefficient (Pulse Width Modulation).

5. A method for transmitting power to wheels of a motor vehicle with an internal-combustion engine and an electric machine connected to a static energy converter with terminals and at least one power semiconductor, the method comprising:
   recuperating and storing kinetic energy of the motor vehicle in a super-capacitor;
   shutting down the internal-combustion engine of the motor vehicle when the speed of the motor vehicle stabilizes;
   using the stored energy in the super-capacitor to supply power to the wheels when the speed of the vehicle is stabilized;
   controlling voltage at the terminals of the static energy converter in order to keep the voltage substantially constant and near to a maximum value allowed by the at least one power semiconductor of the static energy converter; and
   keeping the voltage at the terminals of the static energy converter between two limit values, the first corresponding to $U_2$ and the second corresponding to $(U_1-\lambda.l)$, where:
   $U_1$ is a withstand voltage of the power semiconductor;
   $\lambda.l$ is an over-voltage at the terminals of the power semiconductors, $l$ being the current passing through the electric machine; and
   $U_2$ is the difference between $U_1$ and the maximum over-voltage at the semiconductors.

6. A method for transmitting power to wheels of a motor vehicle with an internal-combustion engine and an electric machine connected to a static energy converter with terminals and at least one power semiconductor, the method comprising:
   recuperating and storing kinetic energy of the motor vehicle in a super-capacitor;
   shutting down the internal-combustion engine of the motor vehicle when the speed of the motor vehicle stabilizes;
   using the stored energy in the super-capacitor to supply power to the wheels when the speed of the vehicle is stabilized;
   controlling voltage at the terminals of the static energy converter in order to keep the voltage substantially constant and near to a maximum value allowed by the at least one power semiconductor of the static energy converter; and
   maintaining the voltage at the terminals of the static energy converter at a reference value $U_{ref}$, equal to:

$$U_{ref}=\text{MIN}[(U_1-\lambda.l);\text{MAX}(U_2;(U_3/k))]$$

where: $U_1$ is a withstand voltage of the power semiconductors;
   $\lambda.l$ is an over-voltage at the terminals of the power semiconductors, $l$ being a current passing through the electric machine;
   $U_2$ is the difference between $U_1$ and a maximum over-voltage at the terminals of the power semiconductors;
   $U_3$ is the voltage at the terminals of the electric machine; and
   k is a constant coefficient referred to as the PWM coefficient (Pulse Width Modulation);
   wherein controlling the voltage at the terminals further comprises keeping the voltage at $U_2$, that being the difference between $U_1$, the withstand voltage of the power semiconductors, and the maximum over-voltage at the terminals of the semiconductors.

* * * * *